United States Patent [19]

Peiker

[11] Patent Number: 5,638,455
[45] Date of Patent: Jun. 10, 1997

[54] MICROPHONE DEVICE

[76] Inventor: Andreas Peiker, Max-Planck-Strasse 32, Friedrichsdorf, Germany, 61381

[21] Appl. No.: 397,992

[22] Filed: Mar. 3, 1995

[30]  Foreign Application Priority Data

Mar. 11, 1994 [CH] Switzerland ................. 730/94

[51] Int. Cl.⁶ .................................................. H04R 25/00
[52] U.S. Cl. ........................... 381/169; 381/168; 381/205
[58] Field of Search ......................... 381/168, 169, 381/188, 205; 181/156; 455/90; 379/433, 440

[56]  References Cited

U.S. PATENT DOCUMENTS 3,256,394  6/1966  Pless ........................................ 381/168
4,290,332  9/1981  Schoeffling, Jr. ....................... 84/1.14
4,303,807  12/1981  Sato ........................................ 181/156
5,508,709  4/1996  Krenz et al. .............................. 455/90

FOREIGN PATENT DOCUMENTS 0141838  11/1980  Japan ..................................... 381/169
1136794  12/1968  United Kingdom ................. 381/169

*Primary Examiner*—Sinh Tran

[57]  ABSTRACT

A microphone device includes two half-shells that can be unfolded and folded-up, connected by a hinge. The device can be used as a sheathed table microphone in the unfolded position. It is folded together for transport, by which a possibly present keyboard is protected.

9 Claims, 1 Drawing Sheet

MICROPHONE DEVICE

PRIOR ART

In conferences that are held in rooms not specially equipped for a certain purpose, microphones are often used that can be set up on the tables of the speakers and chairmen. In most cases, these are hand microphones, which are held in a suitable base. It is disadvantageous in the previously known table microphones that they must be packed carefully for transport, which in most cases is not only time-consuming but also space-consuming.

SUMMARY OF THE INVENTION

The object of the invention is to avoid the above-mentioned drawbacks of the prior art and to provide a compact table microphone that can be used in a versatile manner.

A device with a microphone according to the invention is distinguished by two half-shells that can be unfolded and folded up, connected by a hinge, so that the device is used as a sheathed table microphone set up in the unfolded position.

The invention thus provides a sheathed table microphone, which can be opened and closed like a shell.

The sheathed table microphone according to the invention is very practical to transport, since the hinged half-shells are used at the same time as frame and as packaging for the sensitive parts. Apart from a possibly required key for actuating a release or unfolding mechanism, advantageously no movable parts are provided on the outside of the half-shells (transport protection or safety).

According to a preferred embodiment, the half-shells are thin (in comparison with length and with width, i.e., the thickness is, e.g., about a tenth of the length) and relatively flat and about as big as a hand. As a result, the device in folded-up position has a compact shape (small space requirement) and can simultaneously accommodate a generously-dimensioned and therefore easily operable keyboard.

The half-shells in the unfolded position enclose an angle of at least 50°, preferably 60°. If the microphone is arranged on a front side of one, namely upper half-shell, not only a good height starting from the base is achieved in this way, but the inside of the shell-shaped device is also easily accessible in the presence of a keyboard. Positioning a microphone in the lower half-shell (especially on its front end) is also possible.

Advantageously, the mentioned front side is inclined so that it is directed at least horizontally or slightly upward, when the device is set up as a desk microphone. In this case, an interface microphone is used as a microphone. An interface microphone has a strong pick-up characteristic in the direction of the interface, i.e., in this case parallel to the (inclined) front side. The inclined front side imparts, moreover, a slender and streamlined appearance to the folded-up sheathed table microphone.

When one, e.g., upper half-shell is somewhat more narrow and somewhat longer than the other, e.g., is lower, then the half-shells can be unfolded easily and problem-free by hand.

A special aesthetic effect is produced if the microphone is mounted in a housing part of the upper half-shell projecting like a lobe, which somewhat overlaps the lower half-shell.

The hinge is designed so that it locks in place at least in its two end positions. If need be, several locking positions can be provided. The hinge is arranged concealed, e.g., in the lower half-shell.

A rigid-flexible printed circuit board connects the two half-shells internally (by circuit). In particular, a switch is provided, which automatically turns the microphone on and off, when the half-shells are unfolded or folded up.

Operating keys are provided on the inside of the lower half-shell. They are accessible by the unfolding of the half-shells and are protected during the transport of the sheathed table microphone.

According to an especially preferred embodiment, the device according to the invention has a small loudspeaker at its disposal. The latter is provided, e.g., on the inside of the upper half-shell.

It is especially advantageous if the operating keys are not too small and are spaced sufficiently. In the front area of the half-shells, e.g., two amply-sized operating and switching keys are provided, while in the other part, a ten-key keyboard with several miscellaneous control keys can be present. The ten-key keyboard can be used, e.g., to dial certain lines, as is required, e.g., in the central office of a mobile radiotelephone service system with many subscribers.

On the outside of the lower half-shell, sound-absorbing rubber footings are provided, so that the half-shell can be placed horizontal on a corresponding base. A connecting cable can be connected or is connected to the rear side of the lower half-shell, near the hinge.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention is to be explained below in more detail based on the embodiments and in connection with the drawings. There are shown in.

In principle, the same parts are provided with the same reference symbols in the drawings.

DETAILED DESCRIPTION OF THE PREFERRED EMBODIMENTS

Figure 1:
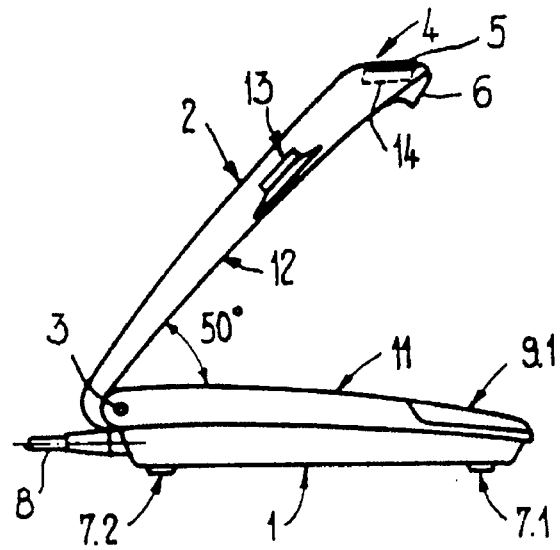
FIG. 1 a sheathed table microphone according to the invention in unfolded position.
Figure 2:
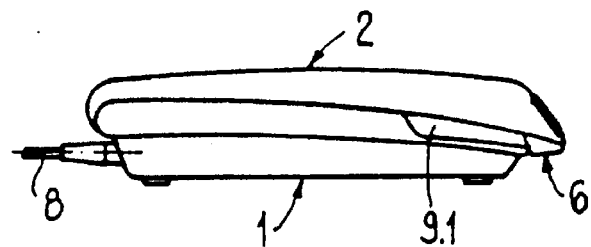
FIG. 2 a sheathed table microphone according to the invention in folded-up position.
Figure 3:
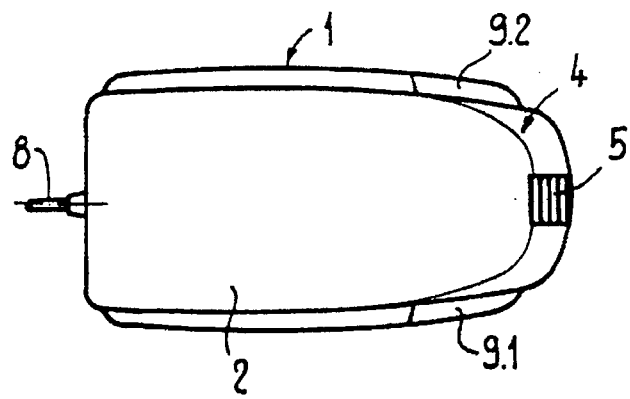
FIG. 3 a top view of the sheathed table microphone in folded-up position.

In FIG. 1 to 4, a preferred embodiment of the device according to the invention is shown. It consists essentially of two oblong half-shells 1, 2 of approximately equal size, which are connected by a hinge (cf. hinge axis 3) on their rear narrow sides. FIG. 1 shows the half-shells in unfolded position and FIG. 2 in folded-up position. The maximum aperture angle is preferably at least 50°. In this example, it is about 60°. As a result, it is assured that the inside of lower half-shell 1 is readily accessible. As is further described below, the latter is equipped with a keyboard panel 10.

The hinge is arranged concealed. Preferably, it is designed so that upper half-shell 2 is locked in place, on the one side, in open end position and, on the other side, in closed end position. Instead of two, three or more locking positions can also be provided.

The thickness of upper half-shell 2 slightly increases from the rear (i.e., from close to hinge axis 3) forward (seat of a microphone 14). Slot openings 5 are provided on an inclined (e.g., at a 45° angle) front side 4, behind which an interface microphone known in the art is mounted. Slot openings 5 are arranged in the middle of the front side.

A housing lobe 6 is made below inclined front side 4 (namely on the front end of inner surface 12 of unfoldable half-shell 2). It projects out from a plane defined by inner surface 12 and projects virtually "downward," and it overlaps the front side of lower half-shell 1 (cf. especially FIG. 2).

Upper half-shell 2 is somewhat more narrow and somewhat longer than lower half-shell 1. The difference in the width lies in the order of magnitude of several millimeters up to 1 cm. The difference in length, on the other hand, is definitely 1 to 2 cm. This can be seen clearly from FIG. 3. Upper half-shell 2 overlaps lower half-shell 1 both on the back side and on the front side. An advantage of this design consists, e.g., in that the device can be easily unfolded by hand.

According to an especially preferred embodiment, the slope (or inclination) of front side 4 (e.g., relative to the longitudinal center axis of the half-shell) is matched to the maximum aperture angle (e.g., 50°–60°), so that mentioned front side 4 in the unfolded device (FIG. 1) is approximately horizontal or is inclined (e.g., by 0°–20°) slightly upward relative to the horizontal support (on which the sheathed table microphone is placed). Correspondingly, the direction of maximum sensitivity of the interface microphone attached in or behind front side 4 is horizontal forward or slightly upward.

Lower half-shell 1 is somewhat thicker than upper half-shell 2. It is slightly tapered from the rear forward. An inside surface 11 slightly inclined forward results. Inside 12 of upper half-shell 2 nestles against inside surface 11 in the folded-together position.

According to an especially preferred embodiment, a loudspeaker frame 13 is installed in upper half-shell 2. It radiates the sound (in the simplest case) essentially perpendicular to inner surface 12. The slots required for the sound radiation are provided near the front end. Since the sound-radiating area has a certain distance from the support, a good sound propagation directed toward the speaker can be assured.

Figure 4:
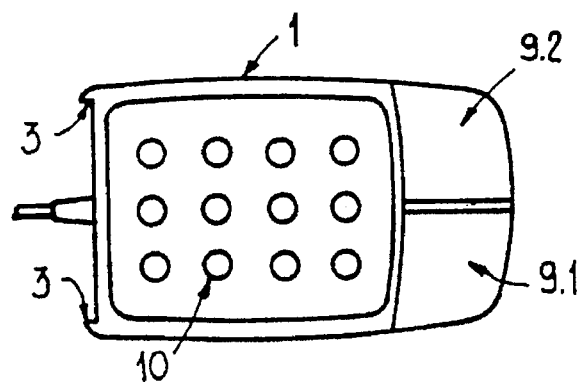
FIG. 4 a top view of the inside of the lower half-shell of the sheathed table microphone.

FIG. 4 shows a top view of the inner surface of lower half-shell 1. In the front area, two amply-sized keys 9.1, 9.2 are provided. Together, they cover the entire width and about a fourth of the length of lower half-shell 1. A keyboard panel 10 is connected behind it, e.g., with a ten-key keyboard and several control keys. The individual keys of the ten-key keyboard are not too small and are spaced sufficiently to make possible an easy and reliable typing. A cable connection 8 is provided on the rear side of lower half-shell 1. Finally, e.g., four sound-absorbing and adhesive rubber footings 7.1, 7.2 are provided on the outside of lower half-shell 1.

Upper and lower half-shells are connected internally by a rigid-flexible printed circuit board. Further, an internal switch is provided, which automatically turns on microphone 14 when unfolding and correspondingly turns it off when folding-up. The speaker can thus turn off his microphone 14 simply by folding-up. It can also be seen at once whether or not microphone 14 is turned on.

The device is about as big as a hand. In this example, the total length of upper half-shell 2 is about 15 to 20 cm, the total width about 8 to 12 cm, the total height in the folded-up position about 4 to 5 cm and that in unfolded position about 14 to 18 cm. Of course, the device can be designed much smaller (e.g., in the size of a cigarette box or even a matchbox).

The device can, of course, have further comfort features, such as, e.g., a locking in the folded-up position to avoid an unintentional unfolding, a spring mechanism, which holds the upper half-shell in unfolded position, etc. Small pilot lights or the like can also be provided. The latter can be arranged, e.g., in or next to keyboard panel 10. But it is very well conceivable to arrange small LED display and pilot lights on front side 4.

The small loudspeaker can be provided, e.g.,—instead, as indicated above—on front side 4 of upper half-shell 2 or on the inside of lower half-shell 1. Depending on position, the sound propagation can be varied or specifically fixed by measures known in the art (thin plates, etc.).

The invention is not limited to a device with a single microphone. For example, two or more microphones (preferably interface microphones) can also be provided. They can be installed at any suitable spot (e.g., on inner surfaces 11, 12, on a narrow side or on the outside of unfoldable half-shell 2). Further, a hand-operated switch to switch from one microphone to the other can be provided.

In principle, the half-shells can also be greatly different in their size. The upper unfoldable half-shell can, e.g., be shorter and/or wider than the lower one. With respect to shape, they can be oblong instead of round.

The aperture angle can be varied within wide ranges. If the inside must not be accessible for lack of a keyboard panel, the maximum aperture angle can be limited possibly to 30°. With suitable geometry and weight distribution (e.g., if the upper half-shell is much smaller and/or lighter than the lower one is), the mentioned angle can be larger than 90°. But for reasons of stability, this is more likely disadvantageous.

It goes without saying that various features can be left out, without diverging from the essence of the invention. Overall, it is considered a great advantage that the sheathed table microphone can be folded together to be transportable in a compact manner and simultaneously to offer a protection for the keys.

The invention being thus described, it will be obvious that the same may be varied in many ways. Such variations are not to be regarded as a departure from the spirit and scope of the invention.

What is claimed is:

1. A microphone device comprising:
   an upper half-shell and a lower half-shell;
   a hinge interconnecting said upper half-shell with said lower half-shell, said hinge allowing said upper half-shell and said lower half-shall to be unfolded and folded-up and to form a clam shell shape; and
   an interface microphone arranged on a front side of said upper half-shell and observable in both an unfolded and a folded-up position, wherein
   the half-shells in the unfolded position enclose an angle of at least 50°, and
   said front side is inclined so that it is directed at least horizontally or slightly upward when the microphone device is placed on a substantially horizontal desktop in the unfolded position.

2. The microphone device according to claim 1, wherein the half-shells are thin and have dimensions substantially equal to a human's hand.

3. The microphone device according to claim 1, wherein said upper half-shell is more narrow and longer than said lower half-shell.

4. The microphone device according to claim 1, wherein said interface microphone is installed in the inclined front side of said upper half-shell adjacent a projecting lobe, said lobe slightly engaging over the lower half-shell.

5. The microphone device according to claim 1, wherein rubber footings are provided on an outside surface of the lower half-shell, and wherein a connecting cable is connected to a rear side of the lower half-shell.

6. The microphone device according to claim 1, wherein operating keys are provided inside of the lower half-shell.

7. The microphone device according to claim 6, wherein two amply-sized operating keys and are provided in a front area of the lower half-shell.

8. The microphone device according to claim 1, wherein a loudspeaker is arranged on an inner surface of one of the half-shells.

9. A microphone device comprising:

an upper half-shell and a lower half-shell;

a hinge interconnecting said upper half-shell with said lower half-shell, said hinge allowing said upper half-shell and said lower half-shell to be unfolded and folded-up and to form a clam shell shape; and an interface microphone arranged on a front side of said upper half-shell, wherein the half-shells in an unfolded position enclose an angle of at least 50°, said upper half-shell is more narrow and longer than said lower half-shell, and the hinge is concealed in the lower half-shell, wherein a flexible printed circuit board connects said upper half-shall and said lower half-shell, and wherein a switch is provided which automatically turns off the interface microphone when the half-shells are folded together.

* * * * *